(12) United States Patent
Saha et al.

(10) Patent No.: US 11,115,935 B1
(45) Date of Patent: Sep. 7, 2021

(54) USE OF POWER HEADROOM ON FIRST AIR INTERFACE AS BASIS TO DYNAMICALLY CONTROL UE SERVICE CAPABILITY WITH RESPECT TO SECOND AIR INTERFACE

(71) Applicant: Sprint Spectrum L.P., Overland Park, KS (US)

(72) Inventors: Sougata Saha, Overland Park, KS (US); Anurag Thantharate, Overland Park, KS (US); Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/947,183

(22) Filed: Jul. 22, 2020

(51) Int. Cl.
*H04W 76/25* (2018.01)
*H04W 52/14* (2009.01)
*H04W 52/36* (2009.01)
*H04W 36/00* (2009.01)

(52) U.S. Cl.
CPC ..... *H04W 52/146* (2013.01); *H04W 36/0027* (2013.01); *H04W 36/00837* (2018.08); *H04W 52/365* (2013.01); *H04W 76/25* (2018.02)

(58) Field of Classification Search
CPC ............. H04W 36/00; H04W 36/0005; H04W 36/0027; H04W 52/146; H04W 36/22; H04W 36/0055; H04W 52/365; H04W 52/367

See application file for complete search history.

(56) References Cited

U.S. PATENT DOCUMENTS

| 2018/0324714 | A1 * | 11/2018 | Yang | H04W 72/10 |
| 2019/0037417 | A1 * | 1/2019 | Lei | H04W 72/085 |
| 2019/0357137 | A1 * | 11/2019 | Shah | H04W 80/08 |
| 2019/0364517 | A1 | 11/2019 | Gaal et al. | |
| 2020/0260389 | A1 * | 8/2020 | Loehr | H04W 52/365 |

FOREIGN PATENT DOCUMENTS

WO    WO 2018/005089    1/2018

OTHER PUBLICATIONS

Jha (Dual connectivity in LTE small cell network)—loading 2014 (Year: 2014).*

* cited by examiner

*Primary Examiner* — Dong-Chang Shiue

(57) ABSTRACT

A method and system for dynamically controlling service capability configuration in a system in which a UE is served concurrently on at least two air-interface connections including a first air-interface connection with a first access node and a second air-interface connection with a second access node and in which the UE applies a dynamic power sharing to control uplink transmit power of the UE respectively on each connection. In an example method, the UE's power headroom on the first connection is determined and is used as a basis to control service capability configuration for service of the UE on the second connection. For instance, based on the UE's power headroom on the first connection, second-connection capabilities data of the UE could be reconfigured to add or remove a service feature capability.

17 Claims, 5 Drawing Sheets

USE OF POWER HEADROOM ON FIRST AIR INTERFACE AS BASIS TO DYNAMICALLY CONTROL UE SERVICE CAPABILITY WITH RESPECT TO SECOND AIR INTERFACE

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has been exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in RF spectrum) having a bandwidth and a center frequency and thus extending from a low-end frequency to a high-end frequency.

On the downlink and uplink channels, the coverage of each access node could define an air interface configured in a specific manner to define physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry synchronization signals that UEs could detect as an indication of the presence of coverage and to establish frame timing, other resource elements could be reserved to carry a reference signal that UEs could measure in order to determine coverage strength, and still other resource elements could be reserved to carry other control signaling such as PRB-scheduling directives and acknowledgement messaging from the access node to served UEs. And on the uplink, certain resource elements could be reserved to carry random access signaling from UEs to the access node, and other resource elements could be reserved to carry other control signaling such as PRB-scheduling requests and acknowledgement signaling from UEs to the access node.

Overview

When a UE enters into coverage of such a system, the UE could detect threshold strong coverage of an access node on a carrier (e.g., a threshold strong reference signal broadcast by the access node on that carrier) and could then engage in random-access and connection signaling with the access node to establish an air-interface connection, such as a Radio Resource Control (RRC) connection, through which the access node will then serve the UE on the carrier.

Further, if the UE is not already registered for service with the core network, the UE could transmit to the access node an attach request, which the access node could forward to a core-network controller for processing. And the core-network controller and access node could then coordinate setup for the UE of one or more user-plane bearers, each including an access-bearer portion that extends between the access node and a core-network gateway that provides connectivity with a transport network and a data-radio-bearer (DRB) portion that extends over the air between the access node and the UE.

In relation to this connection and/or attachment process, the access node could also obtain and store in a context record for the UE a set of UE capabilities data, which could define various service features that the UE supports. For instance, the access node could obtain this data from a subscriber profile registry in the network and/or through signaling with the UE.

Once the UE is so connected and registered, the access node could then serve the UE over the air-interface connection, managing downlink air-interface communication of data to the UE and uplink air-interface communication of data from the UE.

For instance, when the core-network gateway receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in a control region of that subframe a Downlink Control Information (DCI) message that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI message that designates those upcoming PRBs. And the UE could then accordingly transmit the transport block to the access node in the designated PRBs.

For each such scheduled downlink or uplink communication on PRBs between an access node and a UE, the access node and UE could use a modulation and coding scheme (MCS) that is selected based on the UE's wireless channel quality, which the access node could specify in its scheduling directive to the UE.

In a representative implementation, the MCS could define a coding rate based on the extent of error-correction coding data or the like that would be transmitted together with the user-plane data being communicated, and a modulation scheme that establishes how many bits of data could be carried by each resource element. When channel quality is better, the access node may direct use of a higher-order MCS that has a higher coding rate (e.g., with more error-correction coding) and/or hat supports more bits per resource element, and when channel quality is worse, the access node may direct use of a lower-order MCS that may have a lower coding rate and/or supports fewer bits per resource element.

Examples of modulation schemes include, without limitation, quadrature phase-shift keying (QPSK), in which each resource element represents 2 bits of data, 8 phase-shift keying (8PSK), in which each resource element represents 3 bits of data, 16 quadrature amplitude modulation (16QAM), in which each resource element represents 4 bits of data, 32QAM, in which each resource element represents 5 bits of data, 64QAM, in which each resource element represents 6 bits of data, and 256QAM, in which each resource element represents 8 bits of data.

In practice, the access node could determine the MCS to be used use in a given instance based on wireless channel quality reported by the UE. For instance, as the access node serves the UE, the UE could transmit channel quality reports to the access node periodically and/or as part of the UE's scheduling requests or other communications to the access node, with each report including a channel-quality indicator (CQI) value representing the UE's determined channel quality and perhaps one or more other channel metrics such as downlink reference signal receive power (RSRP), signal-to-interference-plus-noise ratio (SINR), or the like. When the access node schedules communications to or from the UE, the access node could then map the UE's latest reported CQI value to a corresponding MCS value using a standard CQI-MCS mapping table, and the access node could direct use of that MCS in the scheduling directive that the access node sends to the UE. Communication could thus occur using that directed MCS.

In addition, a UE could be equipped with a variable-gain power amplifier and associated logic that enables the UE to transmit on the uplink with dynamically set transmit power. And as the access node serves the UE, the access node and UE could regularly engage in a power control process to control the UE's transmit power.

In an example of such a power control process, an uplink receiver at the access node could estimate SINR of transmission from the UE on a per subframe basis or the like and could compare that SINR with an SINR target (which might be dynamically set based on observed communication error rate). When the SINR is below the SINR target, the access node could then transmit to the UE a power-up transmit power control (TPC) command to which the UE would respond by incrementally increasing its transmit power. Whereas, when the SINR is above the SINR target, the access node could transmit to the UE a power-down TPC command to which the UE would respond by incrementally decreasing its transmit power.

The UE's ability to increment its transmit power, however, could be limited by a defined maximum transmit power level (e.g., maximum average transmit power level), e.g., a spectral absorption rate (SAR) limit, which could be established based on a power class of the UE for instance. Industry standards or governmental regulations define various UE power classes, and UEs could be characterized by their manufacturing specifications or other data to be a member of one power class or another. Without limitation, examples of such power classes include Power Class 2, defining a maximum transmit power of 23 dBm (about 200 milliwatts), and Power Class 3, defining a maximum transmit power of 26 dBm (about 400 milliwatts)

With this power limitation and the UE's variable transmit power, the UE may therefore have a variable level of power headroom that defines the difference between (i) the UE's currently set transmit power level based on the power control process and (ii) the UE's maximum transmit power. A positive power-headroom value would mean that the UE has transmit power to spare and can increase its transmit power more if directed to do so, whereas a zero or negative power-headroom value would mean that the UE has already reached its maximum transmit power level and may therefore be unable to transmit with sufficient power.

Each time the UE sends a scheduling request to the access node, the UE could include in the scheduling request a power-headroom report (PHR) indicating the UE's current power headroom. (Such a report may effectively indicate the UE's power headroom by providing a value that maps to, equals, or otherwise represents a difference between the UE's maximum transmit power and the UE's currently set transmit power.) And the access node could use that reported power headroom as a basis to set or adjust the MCS that the access node will direct the UE to use for uplink transmission. If the power headroom is negative, for instance, the access node might artificially reduce the MCS-order from the MCS that corresponds with the UE's reported CQI.

In addition, when an access node serves a UE, the access node and UE may also support various additional services that help facilitate providing the UE with increased peak data rate and improved quality of communications. Without limitation, examples of these services could include carrier-aggregation, MIMO, and dual connectivity.

Carrier-aggregation service involves the access node serving the UE concurrently on multiple carriers, referred to as component carriers, with the access node scheduling communication with the UE on PRBs distributed across the component carriers.

To configure carrier aggregation service, once a UE has connected with an access node on a given carrier, referred to as the UE's primary component carrier (PCC), the access node could add to the UE's connection one or more secondary carriers, each referred to as a secondary component carrier (SCC). The total number of component carriers in the UE's connection could thus define a level or extent of carrier aggregation, such as 2CA (with two component carriers), 3CA (with three component carriers), etc. Further, the access node and UE may support certain levels of carrier-aggregation on the downlink (e.g., DL 2CA, DL 3CA, etc.) and possibly also on the uplink (e.g., UL 2CA, UL 3CA, etc.)

With carrier-aggregation configured, the access node could coordinate air-interface communication with the UE on PRBs distributed across the UE's component carriers. For instance, with downlink carrier aggregation, the access node could designate in a scheduling directive to the UE one or more downlink PRBs respectively in each of the UE's component carriers and could accordingly transmit data to the UE concurrently in those PRBs. And with uplink carrier aggregation, the access node could designate in a scheduling directive to the UE one or more uplink PRBs respectively in each of the UE's component carriers, and the UE could accordingly transmit data to the access node in those PRBs distributed across the carriers.

MIMO service involves air-interface communication occurring concurrently on multiple different RF propagation paths between the access node and the UE, from multiple transmit-antennas at the transmitting end (e.g., at the access node or UE) to multiple receive-antennas at the receiving end (e.g., at the UE or the access node). For instance, with spatial multiplexing, when the transmitting end has data to transmit to the receiving end, the transmitting end could multiplex the onto multiple antenna output ports and thus onto multiple RF propagation paths, each referred to as a MIMO "layer". MIMO service could thus be characterized by how many how many transmit and receive antennas are used, for instance as 2×2 MIMO where both ends use two antennas or as 4×4 MIMO where both ends use 4 antennas. Further, as with carrier-aggregation service, the access node and UE may support such MIMO service on the downlink and/or on the uplink.

To configure MIMO service, the access node might evaluate or learn about the UE's channel quality, perhaps based on a rank-index (RI) report from the UE, and may correlate that channel quality with a number of supported MIMO layers, also considering UE capabilities data for instance. The access node might then work with the UE to schedule air-interface transmission accordingly on the determined number of MIMO layers or otherwise with a particular level of MIMO service.

And dual-connectivity service involves the UE being served concurrently on multiple air-interface connections, possibly with each connection operating according to a different respective RAT, which could be useful in a scenario where the industry advances from one generation of wireless technology to the next, or in other situations.

In an example such dual-connectivity implementation, the UE could have at least two separate and co-existing air-interface connections, including a primary connection with a first access node referred to as a master node (MN) and a secondary connection with a second access node referred to as a secondary node (SN), perhaps with a different RAT per connection. Further, the MN could be responsible for coordinating setup, management, and teardown of dual-connectivity service for the UE and functioning as an anchor point for RRC signaling and core-network control signaling related to the dual-connectivity service, and the SN could function mainly to provide added connectivity and increased aggregate bandwidth for the UE.

When the UE enters into coverage of such a system, the UE could initially scan for and discover threshold strong coverage of the MN, and the UE could then responsively engage in signaling as discussed above to establish a primary connection with the MN and to attach with the network. If the UE supports dual connectivity, the MN could then trigger and/or engage in a process to establish for the UE a secondary connection with the SN, so that the MN and SN can then cooperatively provide the UE with dual-connectivity service. Further, the MN could engage in signaling to establish for the UE a split bearer configuration so that the UE's data flow could be split between the MN and SN. And the MN could provide the SN with a copy of the UE capabilities data, some of which may relate to the secondary-connection operation of the UE, and the SN could store that data in a context record for the UE.

With dual connectivity, each access node could serve the UE respectively in the manner discussed above, scheduling downlink communication on its respective connection with the UE and scheduling uplink communication on its respective connection with the UE. And, on each connection, the serving access node and the UE may support various service features such as those as noted above. For instance, on each connection, the serving access node and UE may support certain levels of uplink MCS, uplink carrier-aggregation, and uplink MIMO service.

Further, for each of the UE's connections, the UE could apply a respective variable gain for its transmit power and could engage in a respective power control process with the respective serving access node as discussed above. But with dual connectivity, the UE's maximum transmit power could restrict the UE's aggregate transmit power across the primary and secondary connections, i.e., requiring the UE's total transmit power on those co-existing connections to not exceed the limit. Therefore, the UE could apply a dynamic power sharing process to distribute its limited uplink transmit power across its connections.

In an example dynamic power sharing process, the UE could apply its maximum transmit power limit to its primary connection and, on a per subframe basis, could treat any remaining transmit power as the UE's maximum transmit power limit for its secondary connection. More particularly, on a per subframe basis, the UE and MN could engage in a power control process as described above to establish the UE's transmit power on the UE's primary connection, capped by the UE's maximum transmit power. And for each subframe where the UE would also engage in transmission on the secondary connection, the UE could then treat the UE's power headroom on the primary connection as being the UE's maximum transmit power on the secondary connection. Further, the UE and SN could likewise engage in a power control process as described above, to establish the UE's transmit power for that same subframe on the secondary connection, capped by the dynamically established maximum transmit power.

The present disclosure stems from a realization that, when a UE is served with dual connectivity and engages in dynamic power sharing, the UE's power headroom on its primary connection may correlate with quality of service on the UE's secondary connection. In particular, when the UE has relatively low power headroom on its primary connection, the UE's maximum transmit power on its secondary connection will be relatively low, which may therefore restrict quality and speed of communication on the secondary connection. Whereas, when the UE has relatively high power headroom on its primary connection, the UE's maximum transmit power on its secondary connection will be relatively high, which may facilitate higher quality and speed of communication on the secondary connection.

The present disclosure provides various technical advances that take advantage of this correlation. The advances could apply generally in a scenario where a UE is served on at least two air-interface connections and engages in dynamic power sharing between the connections. Without limitation, for instance, the advances could apply in the dual connectivity scenario described above, where the UE is served concurrently by an MN over a primary connection between the UE and the MN and by an SN over a secondary connection between the UE and the SN.

In a first respect, in the example scenario, the disclosure provides for using power headroom of the UE on its primary connection with the MN as a basis for dynamically controlling one or more secondary-connection measurement thresholds that would be used as a basis handover of the UE.

In a representative dual-connectivity arrangement, the UE could be configured to monitor its secondary-connection coverage strength and to report to the MN when one or more secondary-connection measurement threshold are met. For instance, the UE may be configured to report to the MN when the UE's coverage strength (e.g., RSRP) of the UE's serving (source) SN becomes lower than a defined "A2" measurement threshold and when the UE detects coverage of another (target) SN that is higher than a defined "A4" measurement threshold. The MN might provision the UE to do this by transmitting to the UE one or more RRC messages including respective measurement objects that define the measurement thresholds.

Further, the MN could be configured to respond to such measurement reporting by coordinating handover of the UE. For instance, this could be handover of the UE's secondary connection from one SN to another SN, while maintaining the UE's primary connection with the MN, or this could be handover from the MN and SN to a different MN and SN altogether, such as to a different cell site. But in either case, the handover would be triggered based on the UE's measurement reporting as to the UE's secondary connection.

In this respect, the disclosure provides for using the UE's power headroom on its primary connection with the MN as a basis to dynamically control one or more of these secondary-connection measurement thresholds.

For instance, when the UE's primary-connection power headroom is threshold low, the MN could set or adjust one or more secondary-connection measurement thresholds for the UE in a manner that would help foster or expedite UE handover. Optimally, this may help facilitate handover of the UE to at least a target SN with which the UE could more successfully engage in uplink secondary-connection communication. Whereas, when the UE's primary-connection power headroom is threshold high, the MN could set or adjust one or more secondary-connection measurement thresholds for the UE in a manner that would deter such handover and prolong the UE being served by the existing SN.

Alternatively, the UE could effectively accomplish the same thing itself by applying or adjusting one or more secondary-connection measurement-threshold bias values in response to determining that the UE's primary-connection power headroom is threshold low or threshold high. For instance, when the UE's primary-connection power headroom is threshold low, the UE could bias one or more of the above-noted measurement thresholds or the UE's associated measurements in a manner that helps foster or expedite UE handover. And when the UE's primary-connection power headroom is threshold high, the UE could bias one or more of the above-noted measurement thresholds or the UE's associated measurements in a manner that helps deter the handover.

In a second respect, in the example scenario, the disclosure provides for using power headroom of the UE on its primary connection with the MN as a basis for dynamically controlling one or more service capability configurations of the UE for service on its secondary connection with the SN. In particular, the UE's primary-connection power headroom could be used as a basis to configure the UE's capability data as to one or more secondary-connection services whose quality of performance could depend on the UE's uplink transmit power. Examples of these service capabilities for the secondary connection could include certain high-order uplink MCS, certain high-order uplink carrier aggregation, and certain high-order uplink MIMO, among other possibilities.

For instance, when the UE's primary-connection power headroom is threshold low, the MN and/or UE could responsively engage in signaling to adjust the UE's second-connection capability data in a manner that would cause the SN to not provide the UE with one or more service features that would likely require relatively high uplink transmit power—such as by changing the UE capability data stored at the SN to indicate that the UE does not support such service features. Whereas, when the UE's primary-connection power headroom is threshold high, the MN and/or UE could responsively engage in signaling to adjust the UE's secondary-connection capability data in a manner that would facilitate having the SN provide the UE with one or more such service features—such as by changing the UE capability data stored at the SN to indicate that the UE supports such service features.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of 4G LTE, 5G NR, and 4G-5G dual connectivity, referred to as EUTRA-NR Dual Connectivity (EN-DC).

With EN-DC, a 4G LTE access node (4G evolved Node-B (eNB)) functions as the MN, and a 5G NR access node (5G next-generation Node-B (gNB)) functions the SN. Thus, a UE could first establish a standalone 4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE.

Figure 1:
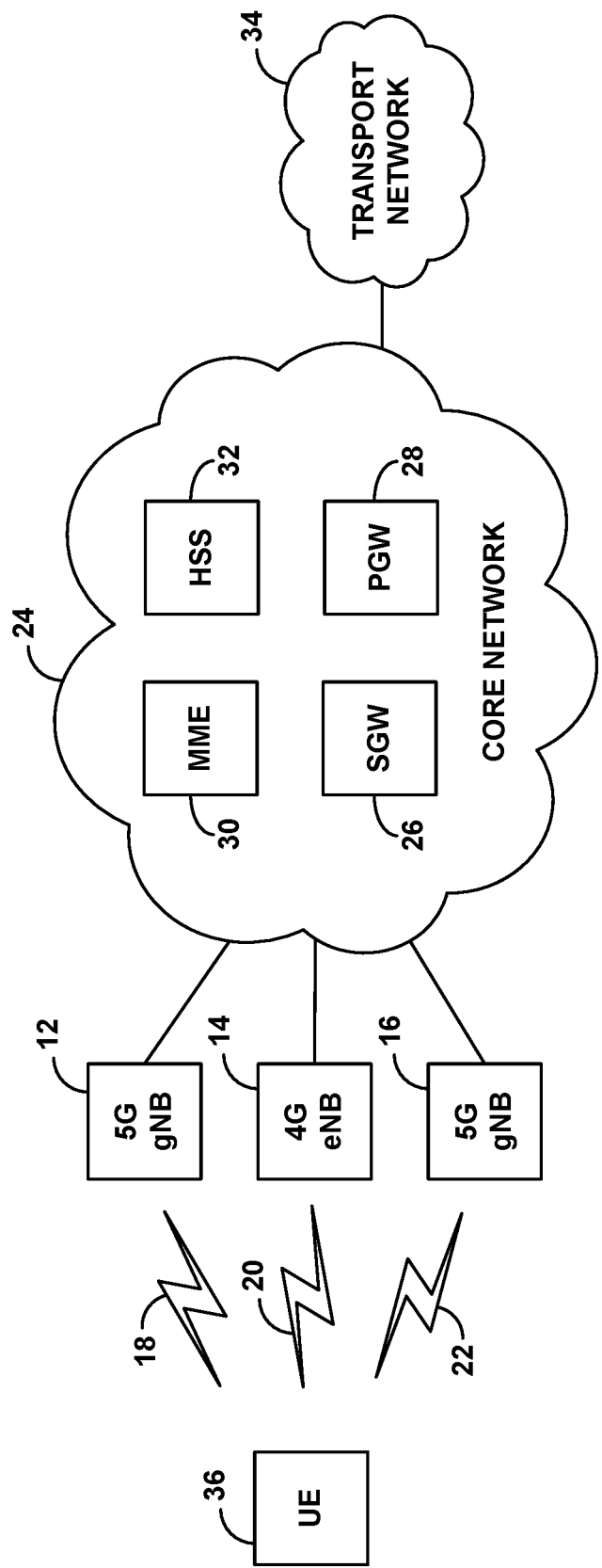
FIG. 1 is a simplified block diagram of an example network arrangement in which features of the present disclosure can be implemented.

It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations FIG. 1 is a simplified block diagram of an example network arrangement including a 4G eNB 12 and two example 5G gNBs 14, 16. These access nodes could be macro access nodes of the type configured to provide a wide range of coverage or could take other forms, such as small cell access nodes, relays, femtocell access nodes, or the like, possibly configured to provide a smaller range of coverage. Further, the access nodes may or may not be collocated with each other, e.g. in a common cell site with collocated RF points of origin.

Each access node could have a respective antenna structure, perhaps an antenna array, that is configured to transmit and receive electromagnetic signals in a region defined by an antenna pattern or radiation pattern, or the access nodes could share portions of a common antenna structure for this purpose. Further, each access node could be configured to provide coverage on at least one respective carrier according to a respective RAT, with each carrier being FDD or TDD as noted above. Namely, the 4G eNB 12 could provide 4G coverage on one or more carriers 18, the 5G eNB 14 could provide 5G coverage on one or more carriers 20, and the 5G gNB 16 could provide 5G coverage on one or more carriers 22.

On the downlink and uplink, the air interface on each such carrier could be structured as described above by way of example, being divided over time into frames, subframes, and symbol time segments, and over frequency into subcarriers, thus defining an array of air-interface resource elements grouped into PRBs allocable by the access node as noted above, for use to carry data to or from served UEs.

Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

In the example arrangement of FIG. 1, each access node is interfaced with a core network 24, such as an Evolved Packet Core (EPC) network or Next Generation Core (NGC) network. Though the access nodes could alternatively interface with different and/or separate core networks. In the example shown, the core network 24 includes a serving gateway (SGW) 26, a packet data network gateway (PGW) 28, a mobility management entity (MME) 30, and a home subscriber server (HSS) 32, although other arrangements are possible as well.

Without limitation, each access node could have an interface with the SGW 26, the SGW 26 could have an interface with the PGW 28, and the PGW 28 could provide connectivity with a transport network 34. Each access node could also have an interface with the MME 30, and the MME 30 could have an interface with the SGW 26, so that the MME 28 could coordinate setup of bearers for UEs to enable the UEs to engage in packet-data communication via 4G and 5G. Alternatively, just the 4G eNB 12 might have an interface with the MME 30 and may function as an anchor for signaling with the MME 30 both for 4G service and for 5G and EN-DC service. In addition, the access nodes could have interfaces with each other, to facilitate inter-access node signaling.

Further, the HSS 32 could store or otherwise have access to UE profile records, which could specify service-subscription plans, UE configurations, and/or other such UE capability information, such as whether a UE supports EN-DC and, perhaps per connection, whether the UE supports certain service features, such as particular uplink modulation schemes, particular levels of uplink carrier aggregation, and/or particular levels of uplink MIMO, among other possibilities.

FIG. 1 also illustrates an example UE 32 in coverage of the access nodes. This UE could be equipped with a 4G LTE radio and a 5G NR radio and could include associated circuitry and logic that enables the UE to engage in 4G LTE service, 5G NR service, and EN-DC service. Further, the UE could include multiple antennas to facilitate MIMO service.

In line with the discussion above, upon entering into coverage of this network, the UE could scan for and discover threshold strong coverage of the 4G eNB 12 on a carrier 18 and could then responsively engage in random access and RRC signaling with the 4G eNB 12 to establish a 4G connection with the 4G eNB 12 on that carrier. Further, through RRC signaling with the UE, the 4G eNB 12 might also add one or more additional carriers 18 to the UE's 4G connection in order to provide the UE with 4G carrier-aggregation service. And the 4G eNB 12 could establish in data storage a context record for the UE and could store in the context record an identification of the UE's established 4G connection and an identification of the 4G carrier(s) on which the UE is connected with the 4G eNB 12.

In addition, the UE could then transmit to the 4G eNB 12 an attach request if appropriate, which the 4G eNB 12 could forward to the MME 30 for processing. And after authenticating the UE, the MME 30 could coordinate setup for the UE of one or more user-plane bearers. For instance, for each such bearer, the MME 30 could engage in signaling with the 4G eNB 12 and the SGW 26 to set up for the UE an S1-U tunnel between the 4G eNB 12 and the SGW 26, the SGW 26 could responsively engage in signaling with the PGW 28 to set up for the UE an S5 tunnel between the SGW 26 and the PGW 28, and the 4G eNB 12 could engage in signaling with the UE to set up for the UE a DRB between the UE and the 4G eNB 12. Further, the 4G eNB 12 could record the operational state of the UE in the UE context record.

In relation to this connection and/or attachment process or at another time, the 4G eNB 12 could also obtain capabilities data regarding the UE and could store the capabilities data in the UE context record for reference while serving the UE. For instance, during the attachment process, the MME 30 could obtain this data from the HSS 32 and could convey the data to the 4G eNB 12 for storage. Alternatively or additionally, the 4G eNB 12 could transmit to the UE an RRC message carrying a UE-capability enquiry, and the UE could respond to the 4G eNB 12 with a "UE capability information" information element (IE) specifying UE capabilities data.

This capabilities data could specify in various ways whether or not the UE supports each of various service features, such as whether the UE supports EN-DC service, whether the UE supports at least a particular level of uplink MCS such as 64QAM or 256QAM for instance, whether the UE supports at least a particular level of uplink carrier aggregation such as UL 2CA or UL 3CA for instance, and whether the UE supports at least a particular level of uplink MIMO such as 2×2 or 4×4 for instance. For example, the capabilities data could be set forth as a feature group indicator (FGI) bit string in which each bit is a Boolean indication of whether or not UE supports a corresponding service feature. Other bit arrangements, coding, or alternate mechanisms could be used to convey such UE capability information as well.

As the example UE supports EN-DC, the 4G eNB 12, operating as MN, could then work to configure EN-DC service for the UE.

For instance, the 4G eNB 12 may select 5G gNB 14 to be an SN for the UE, perhaps based on the UE scanning for 5G coverage and reporting to the 4G eNB 12 that the UE detected threshold strong coverage of 5G gNB 14. And the 4G eNB 12 could then engage in a process to add 5G gNB 14 as an SN for the UE, such as by transmitting to the 5G gNB 14 an SN-Addition request to cause the 5G gNB 14 to allocate resources for a 5G connection for the UE on one or more 5G carriers 20, receiving an SN-Addition-Request acknowledge message from the 5G gNB 14, and engaging in associated RRC signaling with the UE, in response to which the UE could then access and complete establishment of the 5G connection.

Further, the 4G eNB 12 could engage in signaling to transfer to the UE's access bearer (e.g., S1-U tunnel) to the 5G gNB 14 as well and to coordinate setup for the UE of a split bearer to enable the UE's data communication to be split between the 4G eNB 12 and 5G gNB 14. And the 4G eNB 12 could transmit to the 5G gNB 14 a set of the UE capabilities data, which as noted above could indicate whether the UE supports each of various service features, and the 5G gNB 14 could store that capabilities data in a UE context record for reference while serving the UE. The 4G eNB 12 and 5G gNB 14 could then provide the UE with EN-DC service, concurrently serving the UE over their respective connections with the UE. Namely, the 4G eNB 12 could serve the UE on the UE's 4G connection, allocating PRBs of that connection as needed to carry data between the UE and the 4G eNB 12, and the 5G gNB 14 could serve the UE on a TDD air interface, allocating PRBs of that TDD air interface as needed to carry data between the UE and the 5G gNB 14.

To facilitate power control as noted above, the UE could include a variable-gain power amplifier respectively for each of the UE's connections, and the UE could engage in a power control process on a subframe basis or other basis respectively for each connection. Thus, each time the 4G eNB 12 receives a data transmission from the UE, the 4G eNB 12 could evaluate the receive SINR of that transmission and, based on a set-point comparison, could then transmit to the UE (e.g., in a DCI message) a power-down or power-up TPC command to adjust the UE's transmit power on the UE's 4G connection. And likewise, each time the 5G gNB 14 receives a data transmission from the UE, the 5G eNB 14 could evaluate the receive SINR of that transmission and, based on a set-point comparison, could then transmit to the UE (e.g., in a DCI message) a power-down or power-up TPC command to adjust the UE's transmit power on the UE's 5G connection.

Further, as discussed above, the UE may be required to limit its maximum aggregate transmit power to a particular level based on the UE's power class, such as 23 dBm or 26 dBm for instance, and the UE could apply dynamic power sharing to facilitate this. Thus, as discussed above, the UE could regularly compute, as its power headroom on its 4G connection, the difference between its maximum transmit power and its currently set transmit power on the 4G connection. And the UE could then treat that computed power headroom as the UE's maximum transmit power on its 5G connection.

As further discussed above, each access node serving the UE could determine an MCS to configure for air-interface communication between the UE and the access node. Namely, the access node could determine the MCS based on CQI reporting from the UE. And further, for uplink communication, the access node could receive from the UE a report of the UE's power headroom on the connection between the UE and the access node, and the access node could use that reported power headroom as a basis to determine the MCS to configure for uplink communication from the UE. As also noted above, the UE's capabilities data may specify what uplink modulation schemes the UE supports, such as whether the UE supports modulation schemes as high order as 64QAM or even 256QAM for instance.

In addition, as noted above, each access node might also configure use of additional service features for the UE depending on the UE's indicated capabilities. For instance, depending on the UE's indicated support for certain levels of uplink carrier aggregation, the access node might add one or more additional carriers to the UE's connection with the access node, to provide the UE with UL 2CA, UL 3CA, or the like. And depending on the UE's indicated support for certain levels of uplink MIMO, the access node might also configure an associated level of uplink MIMO communication from the UE, such as 2×2 MIMO or 4×4 MIMO for instance.

Still further, in line with the discussion above, when the UE is served with EN-DC, the 4G eNB 12 may provision the UE with various 5G measurement thresholds that could be a basis for triggering handover of the UE. Namely, the 4G eNB 12 could transmit to the UE one or more measurement objects specifying measurement thresholds for the UE's evaluation of the UE's 5G coverage, and the UE could then responsively scan to determine whether such thresholds are met and if so then transmit respective measurement reports to the 4G eNB 12.

As noted one such measurement threshold is the "A2" threshold—which could be an low-RSRP threshold for the UE's coverage from the UE's serving 5G gNB 14. If the UE determines that its RSRP from the 5G gNB 14 is at least as low as the A2 threshold, the UE could responsively transmit to the 4G eNB 12 a measurement report indicating so. That measurement report may then cause the 4G eNB 12 to provision the UE with an "A4" measurement threshold, which could be a high-RSRP threshold for the UE's coverage from another 5G gNB, such as 5G gNB 16. Thus, if the UE determines that its RSRP from that other 5G gNB is at least as high as the A4 threshold, then the UE could responsively report that fact to the 4G eNB 12.

In response to an A4 measurement report from the UE as to the UE's 5G coverage, the 4G eNB 12 may then coordinate handover of the UE. For instance, the 4G eNB 12 may coordinate handover of the UE's secondary connection from 5G gNB 14 to 5G gNB 16, while the 4G eNB 12 continues to serve the UE on the UE's 4G connection. (To do this, the 4G eNB 12 may de-configure the UE's secondary connection with the 5G gNB 14 and instead configure for the UE a secondary connection with the 5G gNB 16.) Or the 4G eNB 12 may coordinate handover for the UE altogether to a different 4G eNB and 5G gNB. (To do this, the 4G eNB 12 could likewise de-configure the UE's secondary connection with the 5G gNB 14. Then the 4G eNB 12 could process handover of the UE's 4G connection to another 4G eNB (not shown), and that other 4G eNB could then coordinate setup for the UE of a secondary 5G connection with another 5G gNB.) Other handover based on the UE's reported 5G coverage could be possible as well.

In line with the discussion above, the present disclosure provides for using the UE's power headroom on the UE's 4G connection as a basis to control the UE's operation with respect to the UE's 5G connection.

As noted above, in one respect, this can involve using the UE's power headroom on its 4G connection as a basis to control setting (e.g., adjustment) of one or more measurement thresholds that the UE would apply as to the UE's 5G connection.

For instance, when the UE's 4G power headroom is at least as low as a predefined threshold level that may be set for this purpose, the 4G eNB 12 could dynamically adjust one or more of the above mentioned 5G measurement thresholds, or others, to help foster handover of the UE. By way of example, the 4G eNB 12 may normally provision the UE with a default 5G A2 threshold of −105 dBm, and in response to the UE's 4G power headroom being threshold low, the 4G eNB 12 may instead provision or re-provision the UE with 5G A2 threshold that is higher than −105 dBm by a few dBm or another delta. Alternatively or additionally, when the 4G eNB 12 provides the UE with an A4 measurement object, the 4G eNB 12 may normally specify a default A4 measurement threshold of −95 dBm, and in response to the UE's 4G power headroom being threshold low, the 4G eNB 12 may instead provision or re-provision the UE with a 5G A4 threshold that is lower than −95 dBm by a few dBm or another delta.

And likewise, when the UE's 4G power headroom is at least as high as a predefined threshold level that may be set for this purpose, the 4G eNB 12 could dynamically adjust one or more of the above mentioned 5G measurement thresholds, or others, to help deter handover of the UE. By way of example, the 4G eNB 12 may normally provision the UE with a default 5G A2 threshold of −105 dBm, and in response to the UE's 4G power headroom being threshold high, the 4G eNB 12 may instead provision or re-provision the UE with 5G A2 threshold that is lower than −105 dBm by a few dBm or another delta. Alternatively or additionally, when the 4G eNB 12 provides the UE with an A4 measurement object, the 4G eNB 12 may normally specify a default A4 measurement threshold of −95 dBm, and in response to the UE's 4G power headroom being threshold high, the 4G eNB 12 may instead provision or re-provision the UE with a 5G A4 threshold that is higher than −95 dBm by a few dBm or another delta.

Further, as noted above, dynamically setting or adjusting one or more 5G measurement thresholds based on the UE's 4G power headroom could alternatively be accomplished in effect by the UE applying one or more measurement bias values. For instance, the UE could respond to it having threshold low 4G power headroom by subtracting from the UE's actually measured RSRP of the UE's serving 5G gNB 14 a given bias value and/or by adding to the UE's actually measured RSRP of a target 5G gNB a given bias value. And/or the UE could respond to it having threshold high 4G power headroom by adding to the UE's actually measured RSRP of the UE's serving 5G gNB 14 a given bias value and/or by subtracting from its actually measured RSRP of a target 5G gNB a given bias value.

Figure 2:
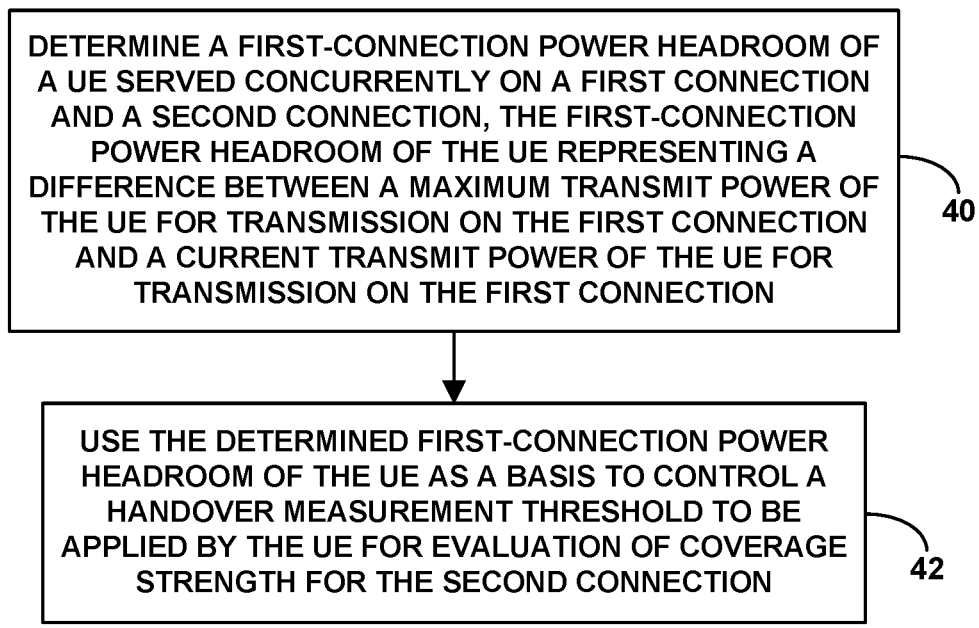
FIG. 2 is a flow chart depicting an example method in accordance with the disclosure.

FIG. 2 is a flow chart illustrating a method that could be carried out accordingly when a UE is served concurrently on at least two connections, including a first connection and a second connection, and the UE applies dynamic power sharing to control uplink transmit power of the UE respectively on each connection. In this scenario, the method could operate to use power headroom of the UE on the first connection as a basis to dynamically control configuration of one or more measurement thresholds that the UE would apply as to the second connection.

As shown in FIG. 2, at block 40, the method includes determining a first-connection power headroom of the UE, the first-connection power headroom of the UE representing a difference between a maximum transmit power of the UE for transmission on the first connection and a current transmit power of the UE for transmission on the first connection. And at block 42, the method includes using the determined first-connection power headroom of the UE as a basis to control a handover measurement threshold to be applied by the UE for evaluation of coverage strength for the second connection.

In line with the discussion above, the act of using the determined first-connection power headroom of the UE as a basis to control the handover measurement threshold to be applied by the UE for evaluation of coverage strength for the second connection could involve comparing the determined first-connection power headroom to a threshold value of power headroom, and controlling the handover measurement threshold based on the comparing.

Further, the act of using the determined first-connection power headroom of the UE as a basis to control the handover measurement threshold to be applied by the UE for evaluation of coverage strength for the second connection could involve (i) making a determination of whether the determined first-connection power headroom of the UE is at least as low as the threshold value of power headroom, (ii) if the determination is that the determined first-connection power headroom of the UE is not at least as low as the predefined threshold value of power headroom, then, based at least on the determination, setting or maintaining the handover measurement threshold to a default value rather than an adjusted value, and (iii) if the determination is that the determined first-connection power headroom of the UE is at least as low as the predefined threshold value of power headroom, then, based at least on the determination, setting or adjusting the handover measurement threshold to the adjusted value rather than the default value, to help facilitate handover of the UE.

Here, for instance, the handover measurement threshold could be a threshold-low coverage strength from the second access node, and the adjusted value could then be higher than the default value. Or the handover measurement threshold could a threshold-high coverage strength from another second access node with which the UE is not currently connected, and the adjusted value could be lower than the default value.

Alternatively, the act of using the determined first-connection power headroom of the UE as a basis to control the handover measurement threshold to be applied by the UE for evaluation of coverage strength for the second connection could involve (i) making a determination of whether the determined first-connection power headroom of the UE is at least as high as the threshold value of power headroom, (ii) if the determination is that the determined first-connection power headroom of the UE is not at least as high as the predefined threshold value of power headroom, then, based at least on the determination, setting or maintaining the handover measurement threshold to a default value rather than an adjusted value, and (iii) if the determination is that the determined first-connection power headroom of the UE is at least as high as the predefined threshold value of power headroom, then, based at least on the determination, setting or adjusting the handover measurement threshold to the adjusted value rather than the default value, to help deter handover of the UE.

And here, for instance, the handover measurement threshold could be a threshold-low coverage strength from the second access node, and the adjusted value could be lower than the default value. Or the handover measurement threshold could be a threshold-high coverage strength from another second access node with which the UE is not currently connected, and the adjusted value could be higher than the default value.

As further discussed above, the first and second connections in this method could be according to different respective radio access technologies. For instance one of the connections (e.g., the first or second) could be a 4G LTE connection, and the other connection could be a 5G NR connection.

In addition, as discussed above, the method could be carried out at least in part by the by the first access node, in which case the act of determining the first-connection power headroom of the UE could involve the first access node receiving from the UE a power headroom report indicating the first-connection power headroom of the UE, where the first access node provisions the UE with the handover measurement threshold. Alternatively or additionally, the method could be carried out at least in part by the UE, perhaps with the controlling of the handover measurement being done effectively by controlling a handover measurement bias.

In another respect as noted above, the present disclosure also provides for using the UE's power headroom on its 4G connection as a basis to control one or more capability settings of the UE as to the UE's 5G connection. In particular, this could involve using the UE's power headroom on its 4G connection as a basis to control whether the UE's capabilities data specifies that the UE supports one or more 5G services whose quality of performance may depend on the UE's 5G uplink transmit power, so as to control whether the UE would receive such 5G services. And as noted above, such services could include certain high-order uplink MCS on the 5G connection, certain high-order uplink carrier aggregation on the 5G connection, and certain high-order uplink MIMO on the 5G connection, among other possibilities.

Thus, when the UE's 4G power headroom is at least as low as a predefined threshold level that may be set for this purpose, the UE's 5G capabilities data could be reconfigured from indicating that the UE supports a given such service to indicating instead that the UE does not support that given service, to prevent the UE from receiving that service.

By way of example, the UE's capabilities data stored at the 5G gNB 14 may indicate that the highest order 5G uplink modulation scheme supported by the UE is 256QAM. And in response to the UE's 4G power headroom being threshold low, that capabilities data could be modified to indicate instead that the highest order 5G uplink modulation scheme supported by the UE is 64QAM, to thereby limit the UE's 5G uplink modulation to be no higher order than 64QAM.

As another example, the UE's capability data stored at the 5G gNB 14 may indicate that the highest order 5G uplink carrier-aggregation service supported by the UE is UL 3CA. And in response to the UE's 4G power headroom being threshold low, that capabilities data could be modified to indicate instead that the highest order 5G uplink carrier-aggregation service supported by the UE is UL 2CA, to thereby limit the UE's 5G uplink carrier aggregation to be no higher order than 2CA.

And as still another example, the UE's capability data stored at the 5G gNB 14 may indicate that the highest order 5G uplink MIMO service supported by the UE is 4×4. And in response to the UE's 4G power headroom being threshold low, that capabilities data could be modified to indicate instead that the highest order 5G uplink MIMO service supported by the UE is 2×2, to thereby limit the UE's 5G uplink MIMO to be no higher order than 2×2.

Likewise, when the UE's 4G power headroom is at least as high as a predefined threshold level that may be set for this purpose, the UE's 5G capabilities data could be reconfigured from indicating that the UE does not support a given such service to indicating instead that the UE does support that given service, to enable the UE to receive that service.

By way of example, the UE's capabilities data stored at the 5G gNB 14 may indicate that the highest order 5G uplink modulation scheme supported by the UE is 64QAM. And in response to the UE's 4G power headroom being threshold high, that capabilities data could be modified to indicate instead that the highest order 5G uplink modulation scheme supported by the UE is 256QAM, to thereby enable the UE's 5G uplink modulation to be up to 256QAM.

As another example, the UE's capability data stored at the 5G gNB 14 may indicate that the highest order 5G uplink carrier-aggregation service supported by the UE is UL 2CA. And in response to the UE's 4G power headroom being threshold high, that capabilities data could be modified to indicate instead that the highest order 5G uplink carrier-aggregation service supported by the UE is UL 3CA, to thereby enable the UE's 5G uplink carrier aggregation to be up to 3CA.

And as still another example, the UE's capability data stored at the 5G gNB 14 may indicate that the highest order 5G uplink MIMO service supported by the UE is 2×2. And in response to the UE's 4G power headroom being threshold high, that capabilities data could be modified to indicate instead that the highest order 5G uplink MIMO service supported by the UE is 4×4, to thereby enable the UE's 5G uplink MIMO to be up to 4×4.

In the example implementation, these or other such changes to the UE's capabilities settings for the UE's 5G connection could be invoked by the 4G eNB 12 and/or by the UE, among other possibilities.

For example, when the 4G eNB 12 receives from the UE a power headroom report that indicates a level of 4G power headroom that is threshold high or threshold low, the 4G eNB 12 could respond to that threshold high reported 4G power headroom by modifying the UE's capabilities data and sending to the 5G gNB 14 an updated set of UE capabilities data, which the 5G gNB 14 could then store for reference when serving the UE.

Alternatively, when the UE determines that the UE's 4G power headroom is threshold high or threshold low, the UE could transmit to the 4G eNB 12 a tracking area update (TAU) message that includes a UE_capability_info_needed parameter set to 1. (As this TAU is unrelated to a change of serving 4G eNB, the 4G eNB 12 may not forward this TAU to the MME 30). The 4G eNB 12 could then respond to that set parameter by sending to the UE a UE-capability enquiry, to which the UE could respond to the 4G eNB 12 with a "UE capability information" information element (IE) providing the changed UE capabilities data. And the 4G eNB 12 could then pass that information along to the 5G gNB 14, to control the 5G gNB's service of the UE.

Figure 3:
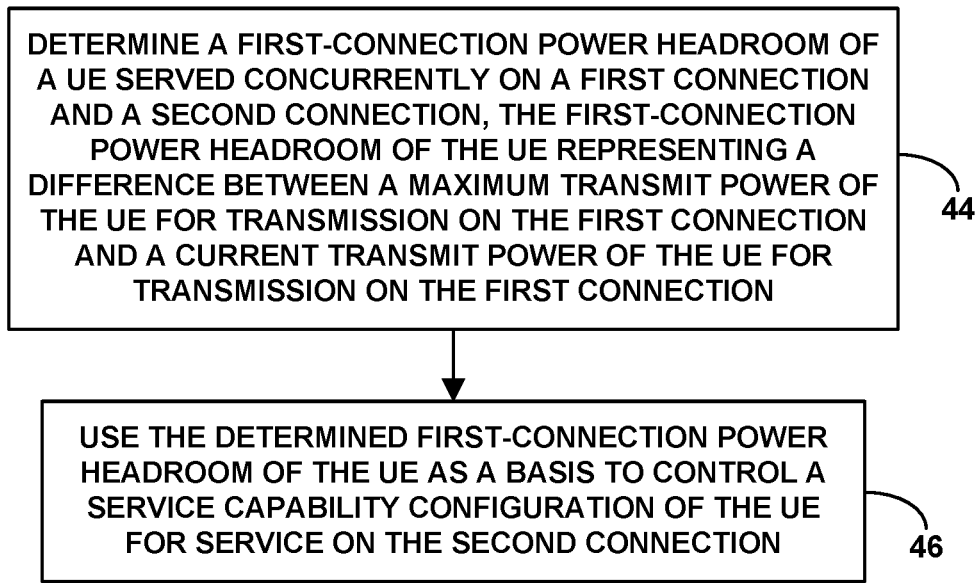
FIG. 3 is another flow chart depicting an example method in accordance with the disclosure.

FIG. 3 is next a flow chart illustrating a method that could be carried out accordingly when a UE is served concurrently on at least two connections, including a first connection and a second connection, and the UE applies dynamic power sharing to control uplink transmit power of the UE respectively on each connection. In this scenario, the method could operate to use power headroom of the UE on the first connection as a basis to dynamically control one or more capability settings of the UE as to the second connection.

As shown in FIG. 3, at block 44, the method includes determining a first-connection power headroom of the UE, the first-connection power headroom of the UE representing a difference between a maximum transmit power of the UE for transmission on the first connection and a current transmit power of the UE for transmission on the first connection. And at block 46, the method includes using the determined first-connection power headroom of the UE as a basis to control a service capability configuration of the UE for service on the second connection.

In line with the discussion above, in this method, the second access node could store capabilities data that indicates for each of multiple service features whether the UE supports the service feature on the second connection. And the act of using the determined first-connection power headroom of the UE as a basis to control a service capability configuration of the UE for service on the second connection could involve comparing the determined first-connection power headroom to a threshold value of power headroom, and revising the stored capabilities data based on the comparing.

Further, the act of using the determined first-connection power headroom of the UE as a basis to control a service capability configuration of the UE for service on the second connection could involve using the determined first-connection power headroom of the UE as a basis to control whether the capabilities data indicates that UE supports a given service feature on the second connection. And as noted above, whether the capabilities data indicates that the UE supports the given service feature on the second connection could govern whether the UE receives the given service feature on the second connection, such as by controlling whether the second access node provides the UE with the given service feature.

In addition, as noted above, the given feature could be a feature such as a particular uplink modulation scheme, a particular level of uplink carrier aggregation, and/or a particular level of uplink multiple-input-multiple-output (MIMO).

Further, as noted above, the capabilities data could indicate by default that the UE supports the given feature on the second connection, in which case the act of using the determined first-connection power headroom of the UE as a basis to control whether the capabilities data indicates that UE supports a given service feature on the second connection could involve (i) making a determination that the determined first-connection power headroom of the UE is at least as low as the threshold value of power headroom and (ii) responsive to the determination, reconfiguring the capabilities data to indicate that the UE does not support the given feature on the second connection.

Alternatively, the capabilities data could indicated by default that the UE does not support the given feature on the second connection, in which case the act of using the determined first-connection power headroom of the UE as a basis to control whether the capabilities data indicates that UE supports a given service feature on the second connection could involve (i) making a determination that the determined first-connection power headroom of the UE is at least as high as the threshold value of power headroom and (ii) responsive to the determination, reconfiguring the capabilities data to indicate that the UE supports the given feature on the second connection.

Still further, the method could be carried out at least in part by the first access node. And in that case, the act of determining the first-connection power headroom of the UE could involve the first access node receiving from the UE a power headroom report indicating the first-connection power headroom of the UE, and the act of using the determined first-connection power headroom of the UE as a basis to control a service capability configuration of the UE for service on the second connection could involve the first access node engaging in signaling to reconfigure UE capabilities data stored by the second access node for reference by the second access node in serving the UE on the second connection.

Alternatively or additionally, the method could be carried out at least in part by the UE, and as noted above, the second access node could store capabilities data that indicates for each of multiple service features whether the UE supports the service feature on the second connection. And in that case, the act of using the determined first-connection power headroom of the UE as a basis to control a service capability configuration of the UE for service on the second connection could involve the UE engaging in signaling with the first access node to provide the first access node with revised capabilities data for transmission by the first access node to the second access node.

Figure 4:
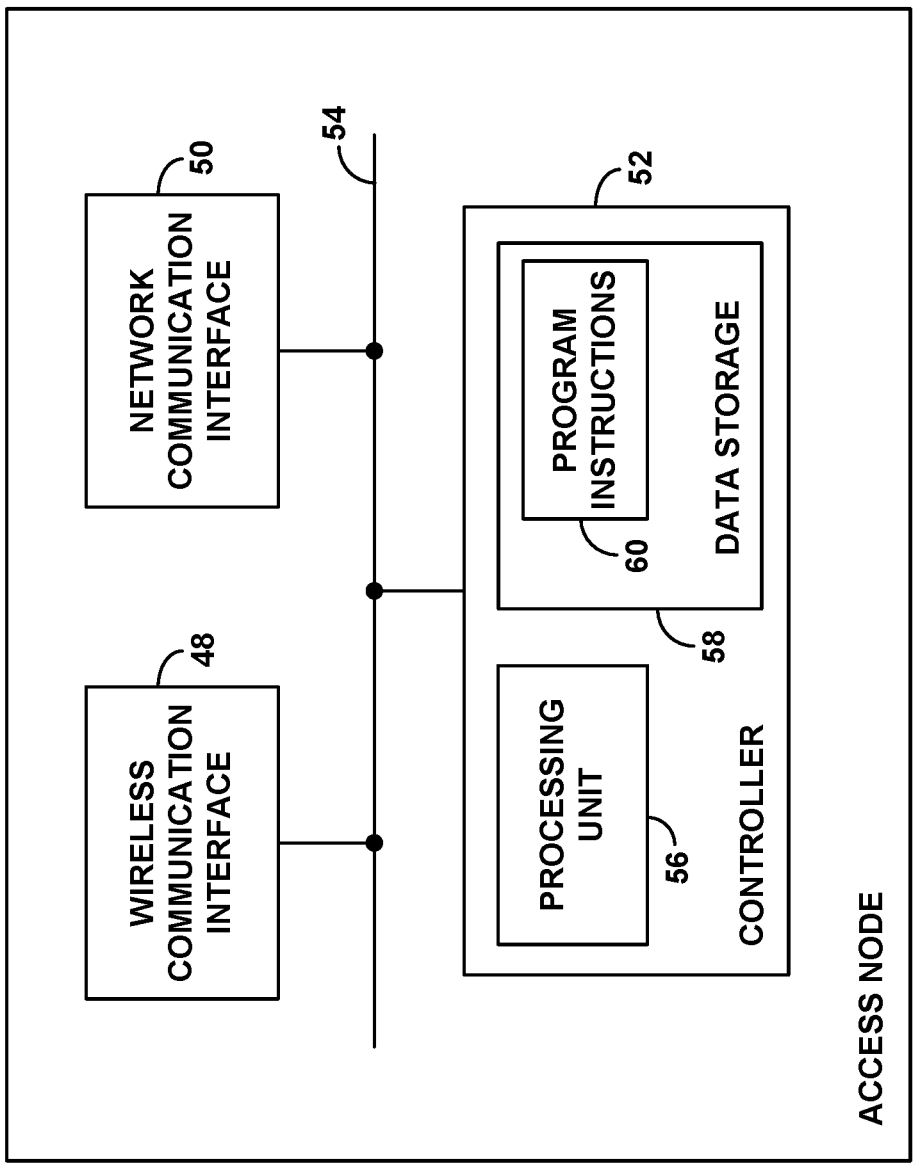
FIG. 4 is a simplified block diagram of an example access node operable in accordance with the disclosure.

FIG. 4 is a simplified block diagram of an access node, showing some of the components that could be included to facilitate carrying out various operations as described herein. This access node could represent one of the access nodes described, among other possibilities.

As shown, the example access node includes a wireless communication interface 48, a network communication interface 50, and a controller 52, all of which could be integrated together and/or communicatively linked together by a system bus, network, or other connection mechanism 54.

In this example arrangement, the wireless communication interface 48 (which might comprise multiple separate wireless communication interfaces or an integrated interface) could be configured to provide cellular coverage and service on one or more carriers according to a particular RAT. As such, the wireless communication interface 48 could comprise an antenna structure, which could be tower mounted or could take other forms, and associated components such as a power amplifier and a wireless transceiver, to facilitate operation as described above. Further, network communication interface 50 could comprise a wired or wireless interface, such as an Ethernet network communication interface, configured to support communication with other entities, such as entities core network 24.

Controller 52 could then comprise control logic to cause the first access node to carry out various operations including those discussed above. As such, the controller 52 could take various forms, including but not limited to a processing unit 56 including one or more processors (e.g., general purpose microprocessors and/or dedicated processing units) and non-transitory data storage 58 (e.g., one or more volatile and/or non-volatile storage components, such as magnetic, optical, or flash storage) holding, storing, encoded with, or otherwise embodying or having program instructions 60 executable by the processing unit to cause the first access node to carry out various operations described herein.

Figure 5:
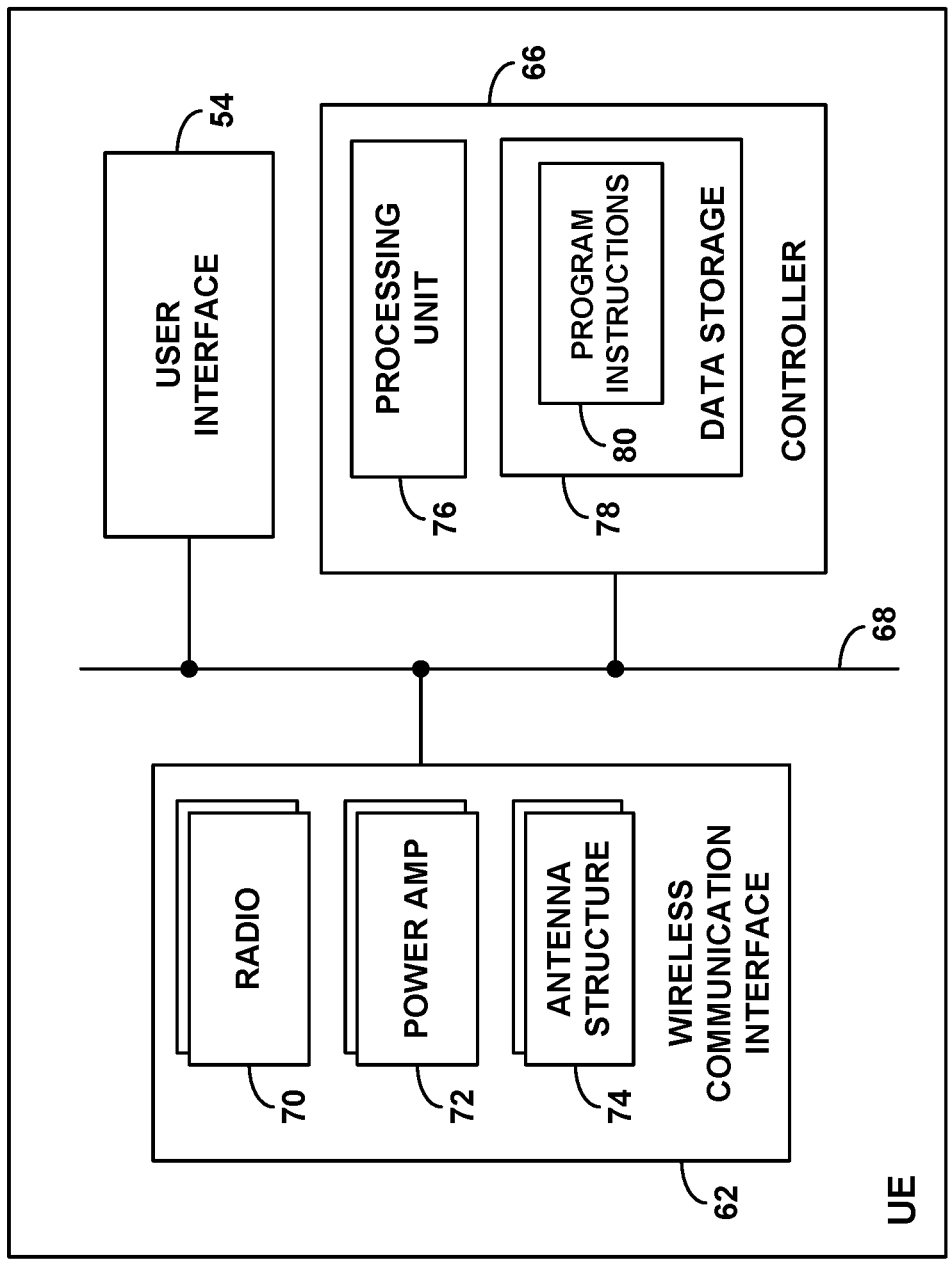
FIG. 5 is a simplified block diagram of an example UE operable in accordance with the disclosure.

Finally, FIG. 5 is a simplified block diagram of an example UE, showing some of the components that could be included to facilitate carrying out various operations as described herein. As shown in FIG. 5, the example UE includes a wireless communication interface 62, a user interface 64, and a controller 66. These components could be interconnected, integrated, and/or communicatively linked together in various ways now known or later developed, such as by a system bus or other connection mechanism 68 for instance.

The wireless communication interface 62 could operate to support and thus facilitate air interface communication concurrently on a first connection and a second connection, and the wireless communication interface could operate to support and thus facilitate variable transmit power of the UE respectively on each connection. As shown, for instance, the wireless communication interface could include multiple radios 70, multiple variable-gain power amplifiers 72 governing uplink transmit power of the UE on the connections, and one or more antenna structures 74.

The user interface 64, which could be included if the UE is user operated, could include input and output components (not shown) to facilitate interaction with a user. For instance, the user interface could include analog-to-digital conversion circuitry and could include input components such as a touch screen, microphone, and keypad, and output components such as a display screen and sound speaker.

And the controller 66, which could be integrated with wireless communication interface 62 (e.g., on a common chipset) or provided in another manner could operate to carry out or cause the UE to carry out various operations described herein. As shown, controller 60 could include a at least one processing unit 76 (e.g., one or more general purpose processors such as microprocessors and/or one or more special purpose processors such as application specific integrated circuits), and non-transitory data storage 78 (e.g., one or more volatile and/or non-volatile storage components, such as magnetic, optical and/or flash storage). And non-transitory data storage 78 could hold program instructions 80, which could be executable by the processing unit 70 to carry out the various described operations. Alternatively, the controller could take other forms.

Various features discussed above can be carried out in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for dynamically controlling service capability configuration in a system in which a user equipment device (UE) is served concurrently on at least two air-interface connections including a first air-interface connection with a first access node and a second air-interface connection with a second access node and in which the UE applies a dynamic power sharing to control uplink transmit power of the UE respectively on each connection, the method comprising:

determining a first-connection power headroom of the UE, wherein the first-connection power headroom of the UE represents a difference between a maximum transmit power of the UE for transmission on the first connection and a current transmit power of the UE for transmission on the first connection; and using the determined first-connection power headroom of the UE as a basis to control a service capability configuration of the UE for service on the second connection, wherein the second access node stores capabilities data that indicates for each of multiple service features whether the UE supports the service feature on the second connection, and wherein using the determined first-connection power headroom of the UE as a basis to control a service capability configuration of the UE for service on the second connection comprises (i) comparing the determined first-connection power headroom to a threshold value of power headroom and (ii) revising the stored capabilities data based on the comparing.

2. The method of claim 1, wherein using the determined first-connection power headroom of the UE as a basis to control a service capability configuration of the UE for service on the second connection comprises:

using the determined first-connection power headroom of the UE as a basis to control whether the capabilities data indicates that the UE supports a given service feature on the second connection, whereby whether the capabilities data indicates that the UE supports the given service feature on the second connection governs whether the UE receives the given service feature on the second connection.

3. The method of claim 2, wherein the given service feature comprises a feature selected from the group consisting of a particular uplink modulation scheme, a particular level of uplink carrier aggregation, and a particular level of uplink multiple-input-multiple-output (MIMO).

4. The method of claim 2, wherein the capabilities data indicates by default that the UE supports the given feature on the second connection, and wherein using the determined first-connection power headroom of the UE as a basis to control whether the capabilities data indicates that the UE supports a given service feature on the second connection comprises:

making a determination that the determined first-connection power headroom of the UE is at least as low as the threshold value of power headroom; and responsive to the determination, reconfiguring the capabilities data to indicate that the UE does not support the given feature on the second connection.

5. The method of claim 2, wherein the capabilities data indicates by default that the UE does not support the given feature on the second connection, and wherein using the determined first-connection power headroom of the UE as a basis to control whether the capabilities data indicates that the UE supports a given service feature on the second connection comprises:

making a determination that the determined first-connection power headroom of the UE is at least as high as the threshold value of power headroom; and responsive to the determination, reconfiguring the capabilities data to indicate that the UE supports the given feature on the second connection.

6. The method of claim 1, wherein the first connection and second connection are according to different respective radio access technologies.

7. The method of claim 1, wherein the method is carried out at least in part by the first access node,
wherein determining the first-connection power headroom of the UE comprises receiving by the first access node from the UE a power headroom report indicating the first-connection power headroom of the UE, and
wherein using the determined first-connection power headroom of the UE as a basis to control a service capability configuration of the UE for service on the second connection comprises engaging in signaling by the first access node to reconfigure the capabilities data stored by the second access node for reference by the second access node in serving the UE on the second connection.

8. The method of claim 1, wherein the method is carried out at least in part by the UE, wherein using the determined first-connection power headroom of the UE as a basis to control a service capability configuration of the UE for service on the second connection comprises:
engaging by the UE in signaling with the first access node to provide the first access node with revised capabilities data for transmission by the first access node to the second access node.

9. A first access node configured to control service capability configuration in a system in which a user equipment device (UE) has a first connection with the first access node and a second connection with a second access node, the first access node comprising:
a wireless communication interface through which the first access node is configured to provide the service on the first connection;
a network communication interface though which the first access node is configured to communicate on a core network; and
a controller for controlling the handover measurement threshold by carrying out operations including:
determining a first-connection power headroom of the UE, wherein the first-connection power headroom of the UE represents a difference between a maximum transmit power of the UE for transmission on the first connection and a current transmit power of the UE for transmission on the first connection, and
using the determined first-connection power headroom of the UE as a basis to control a service capability configuration of the UE for service on the second connection,
wherein the second access node stores capabilities data that indicates for each of multiple service features whether the UE supports the service feature on the second connection, and wherein using the determined first-connection power headroom of the UE as a basis to control a service capability configuration of the UE for service on the second connection comprises (i) comparing the determined first-connection power headroom to a threshold value of power headroom and (ii) revising the stored capabilities data based on the comparing.

10. The first access node of claim 9,
wherein determining the first-connection power headroom of the UE comprises receiving from the UE a power headroom report indicating the first-connection power headroom of the UE, and
wherein using the determined first-connection power headroom of the UE as a basis to control a service capability configuration of the UE for service on the second connection comprises engaging in signaling to reconfigure the capabilities data stored by the second access node for reference by the second access node in serving the UE on the second connection.

11. The first access node of claim 9, wherein the controller comprises at least one processing unit, non-transitory data storage, and program instructions stored in the non-transitory data storage and executable by the at least one processing unit to carry out the operations.

12. A user equipment device (UE) comprising:
a wireless communication interface supporting air interface communication concurrently on a first air-interface connection with a first access node and a second air-interface connection with a second access node, wherein the wireless communication interface supports variable transmit power of the UE respectively on each air interface; and
a controller configured to cause the UE to carry out operations including:
determining a first-connection power headroom of the UE, wherein the first-connection power headroom of the UE represents a difference between a maximum transmit power of the UE for transmission on the first connection and a current transmit power of the UE for transmission on the first connection, and
using the determined first-connection power headroom of the UE as a basis to control a service capability configuration of the UE for service on the second connection,
wherein the second access node stores capabilities data that indicates for each of multiple service features whether the UE supports the service feature on the second connection, and wherein using the determined first-connection power headroom of the UE as a basis to control a service capability configuration of the UE for service on the second connection comprises (i) comparing the determined first-connection power headroom to a threshold value of power headroom and (ii) revising the stored capabilities data based on the comparing.

13. The UE of claim 12, wherein using the determined first-connection power headroom of the UE as a basis to control a service capability configuration of the UE for service on the second connection comprises:
using the determined first-connection power headroom of the UE as a basis to control whether the capabilities data indicates that the UE supports a given service feature on the second connection,
whereby whether the capabilities data indicates that the UE supports the given service feature on the second connection governs whether the UE receives the given service feature on the second connection.

14. The UE of claim 13, wherein the given service feature comprises a feature selected from the group consisting of a particular uplink modulation scheme, a particular level of uplink carrier aggregation, and a particular level of uplink multiple-input-multiple-output (MIMO).

15. The UE of claim 13, wherein the capabilities data indicates by default that the UE supports the given feature on the second connection, and wherein using the determined first-connection power headroom of the UE as a basis to control whether the capabilities data indicates that the UE supports a given service feature on the second connection comprises:

making a determination that the determined first-connection power headroom of the UE is at least as low as the threshold value of power headroom; and responsive to the determination, engaging in signaling to reconfigure the capabilities data to indicate that the UE does not support the given feature on the second connection.

16. The UE of claim 13, wherein the capabilities data indicates by default that the UE does not support the given feature on the second connection, and wherein using the determined first-connection power headroom of the UE as a basis to control whether the capabilities data indicates that the UE supports a given service feature on the second connection comprises:

making a determination that the determined first-connection power headroom of the UE is at least as high as the threshold value of power headroom; and responsive to the determination, engaging in signaling to reconfigure the capabilities data to indicate that the UE supports the given feature on the second connection.

17. The UE of claim 12, wherein the controller comprises at least one processing unit, non-transitory data storage, and program instructions stored in the non-transitory data storage and executable by the at least one processing unit to carry out the operations.

* * * * *